(12) United States Patent
Schwarz

(10) Patent No.: US 6,443,679 B1
(45) Date of Patent: Sep. 3, 2002

(54) VIBRATION-DAMPING CONNECTING ARRANGEMENT FOR THE DETACHABLE CONNECTION OF TWO COMPONENTS WITH A RELEASING PART, WHICH CAN BE MOVED ON A BOLT GUIDED BY A BUSH

(75) Inventor: Helmut Schwarz, Weil der stadt (DE)

(73) Assignee: Schwarz Verbindings-Systeme GmbH, Althengstett (DE)

(*) Notice: Subject to any disclaimer, the term of this patent is extended or adjusted under 35 U.S.C. 154(b) by 104 days.

(21) Appl. No.: 09/717,157

(22) Filed: Nov. 22, 2000

(30) Foreign Application Priority Data

Nov. 23, 1999 (DE) .......................... 299 20 499

(51) Int. Cl.[7] .............................. F16B 21/18
(52) U.S. Cl. .................. 411/352; 24/458; 24/573.11; 403/325
(58) Field of Search .................. 403/DIG. 4, DIG. 14, 403/326, 327, 329, 360, 16, 21, 325, 120, 33; 411/352, 353, 371.1; 24/458, 573.11

(56) References Cited

U.S. PATENT DOCUMENTS

| | | | |
|---|---|---|---|
| 1,305,979 A | * | 6/1919 | Cobe |
| 2,200,702 A | * | 5/1940 | Oddie |
| 2,252,286 A | * | 8/1941 | Hathorn |
| 2,631,330 A | * | 3/1953 | Becker |
| 2,995,969 A | * | 8/1961 | Kraus et al. |
| 3,125,922 A | * | 3/1964 | Sauter |
| 3,896,698 A | | 7/1975 | Aylott |
| 4,442,571 A | * | 4/1984 | Davis et al. |
| 4,522,378 A | | 6/1985 | Nelson |
| 4,921,371 A | | 5/1990 | Boiraeu et al. |
| 5,011,355 A | * | 4/1991 | Motoshige |
| 5,688,093 A | * | 11/1997 | Bowers |
| 5,810,535 A | * | 9/1998 | Fleckenstein et al. |

FOREIGN PATENT DOCUMENTS

| | | |
|---|---|---|
| DE | 2200044 | 8/1972 |
| DE | 7403520 | 5/1974 |
| DE | 8409803 | 9/1984 |
| DE | 9004103 | 7/1990 |
| DE | 4138047 | 3/1994 |
| DE | 29716096 | 12/1997 |

* cited by examiner

Primary Examiner—Lynne H. Browne
Assistant Examiner—Kenn Thompson
(74) Attorney, Agent, or Firm—Greenblum & Bernstein, P.L.C.

(57) ABSTRACT

Connecting arrangement for the detachable connection of two components having openings aligned toward one another, which includes a bolt having a shoulder part, and a locking part attached to an end of the bolt. A leaf-spring arrangement is adapted to engage the locking part when the bolt is pressed into the bush to a locking position, and a releasing part is movably coupled to the bolt between the shoulder part and the locking part. A vibration-damping ring includes of elastic material having an opening to receive the bush and a peripheral groove arranged concentrically to a ring axis adapted to receive an edge of the opening of the second component. The vibration-damping ring is adapted for coupling to the first component, and the leaf-spring arrangement is coupled to the vibration-damping ring. A stop is located on a side of the vibration-damping ring to be turned away from the components.

20 Claims, 2 Drawing Sheets

VIBRATION-DAMPING CONNECTING ARRANGEMENT FOR THE DETACHABLE CONNECTION OF TWO COMPONENTS WITH A RELEASING PART, WHICH CAN BE MOVED ON A BOLT GUIDED BY A BUSH

CROSS-REFERENCE TO RELATED APPLICATIONS

The present application claims priority under 35 U.S.C. §119 of German Patent Application No. 299 20 499.5, filed on Nov. 23, 1999, the disclosure of which is expressly incorporated by reference herein in its entirety.

BACKGROUND OF THE INVENTION

1. Field of the Invention

The invention refers to an arrangement for the detachable connection of two components where elements of this arrangement, which can be connected with or disconnected from one another, are attached to either component.

2. Discussion of Background Information

A connecting arrangement of this kind, referred to as a so-called "spring-clip connection," with a releasing part which moves on a bush-guided bolt, is described, e.g., by the German Patent No. DE 41 38 047.

Besides permitting quick connections, connecting arrangements of this type have the advantage of allowing easy dismantling for repair and maintenance purposes. They are used particularly in aircraft and road vehicles for attaching interior panelling.

The connecting arrangement described in the above-mentioned patent DE 41 38 047 refers to components with aligned openings, where a spring-loaded bolt guided in a bush is provided in a hole of one of the parts being connected, a locking part is attached to the end of the bolt, which, when the bolt is pressed in, engages detachably into a spring attached to the other part, and a releasing part, which can be moved up to a shoulder part on the bolt, expands the spring to release the connection when the bolt is pressed in further.

However, with this known connecting arrangement, the undesirable vibrations arising in one component are transmitted to the other component.

SUMMARY OF THE INVENTION

In order to avoid the above-noted drawbacks, the present invention is provides a vibration-damping connecting arrangement, which includes a particularly effective leaf-spring arrangement for such a vibration-damping connecting arrangement.

The present invention is directed to a connecting arrangement for the detachable connection of two components with openings aligned towards one another. The connecting arrangement includes a bolt, which is guided in a bush with bush head, located in a hole of one part being connected, a locking part attached to an end of the bolt, which, when the bolt is pressed in, engages with a leaf-spring arrangement connected to the other part, and a releasing part, which can be moved up to a shoulder part on the bolt, arranged to expand the leaf-spring arrangement to release the connection when the bolt is pressed in further. The connecting arrangement also includes a vibration-damping ring of elastic material having an opening into which the bush is located, so that the vibration-damping ring is positioned against a first component connected with the bush head. The vibration-damping ring has a peripheral groove arranged concentrically to its axis, to receive an edge of an opening in a second component. The leaf-spring arrangement is connected with the vibration-damping ring and a device forming a stop with reference to the opening of the second component is provided on the side of the vibration-damping ring turned away from the components.

The device forming the stop can include a disk ring whose outer diameter is greater than the diameter of the opening in the second component.

The device forming the stop is connected with the vibration-damping ring by clips, where, in each case, one end of the clip is embedded in the vibration-damping ring, e.g., by vulcanizing or casting in.

The leaf-spring arrangement is connected with the vibration-damping ring by embedding, e.g., by vulcanizing or casting in.

The device forming the stop and/or the leaf-spring arrangement is connected with a clamping holder hooking over the interior wall of the vibration-damping ring.

The leaf-spring arrangement has a base bent in the form of a ring, from whose upper edge at least two leaf-spring arms project, which are inclined inwardly and which are tapered toward their free end. The free ends are shaped like a ring segment- for a positive-locking fit into the engaging recess between the locking part and releasing part, and their free ends are formed to be expanded by the releasing part.

The free ends of the leaf-spring arms are bent (or curved) outwardly.

The base part can include catches which point outwards.

Moreover, when the leaf-spring arms engage an engaging recess between the locking part and releasing part, the releasing part lies against the leaf-spring arms.

The present invention is directed to a connecting arrangement for the detachable connection of two components having openings aligned toward one another. The connecting arrangement-includes a bolt having a shoulder part, a bush with a bush head adapted to extend into the opening of a first of the two components such that the bush head is adapted to be coupled to the first component, and a locking part is attached to an end of the bolt. A leaf-spring arrangement is adapted for connection to a second of the two components to engage the locking part when the bolt is pressed into the bush to a locking position, and a releasing part, which is movably coupled to the bolt between the shoulder part and the locking part. The releasing part is arranged to expand the leaf-spring arrangement, so as to release the engagement between the locking part and the leaf-spring arrangement when the bolt is pressed further into the bush to a release position. A vibration-damping ring includes of elastic material having an opening to receive the bush and a peripheral groove arranged concentrically to a ring axis, which is adapted to receive an edge of the opening of the second component. The vibration-damping ring is adapted for coupling to the first component, and the leaf-spring arrangement is coupled to the vibration-damping ring. A stop is located on a side of the vibration-damping ring which is adapted to be turned away from the two components.

According to a feature of the invention, the stop may include a disk ring whose outer diameter is greater than a diameter of the opening in the second component.

In accordance with another feature of the present invention, the arrangement can also include clips. Each clip can have an end embedded in the vibration-damping ring, and the stop may be coupled to the vibration-damping ring by the clips. The ends of the clips may be embedded in the vibration-damping ring by one of vulcanization or casting in.

In accordance with another feature of the invention, a part of the leaf-spring arrangement may be embedded in the vibration-damping ring by one of vulcanization or casting in.

The arrangement may also include a clamping holder arranged to hook over an interior wall of the vibration-damping ring. At least one of the stop and the leaf-spring arrangement may be coupled to the clamping holder.

Further, the leaf-spring arrangement may include a base, bent in the form of a ring, having an upper edge from which at least two leaf-spring arms are arranged to project. The at least two leaf-spring arms can be inclined inwardly and tapered toward their free ends, and the free ends may be arranged to form a ring segment for a positive-locking fit in an engaging recess located between the locking part and the releasing part, and are further arranged to be expanded by the releasing part. The free ends of the leaf-spring arms may be bent outwardly. Further, the base part can include catches which point outwardly.

Moreover, when the leaf-spring arms engage an engaging recess between the locking part and the releasing part, the releasing part can lie against the leaf-spring arms.

The present invention is also directed to an apparatus for the detachable connection of a first and second component, in which, in connection, the first and second components each have openings aligned with each other. The apparatus includes a vibration-damping ring having an opening adapted to align with the openings of the first and second components and a peripheral groove arranged concentrically to the vibration-dampening ring opening, a bolt having a shoulder part which is axially insertable within the vibration-damping ring opening, a locking part attached to an end of the bolt, and a releasing part, which is axially movably along the bolt between the shoulder part and the locking part. A leaf-spring arrangement is coupled to the vibration-damping ring and detachably coupled to an engaging recess delimited by the locking part and the releasing part.

In accordance with a feature of the instant invention, the peripheral groove of the vibration-damping ring can be adapted to receive an edge of the opening of the second component. The vibration-damping ring may be adapted to contact the first component, a bush may be adapted for insertion into the opening in the first component, and may be insertable into the vibration-damping ring, and the bolt may be insertable into through the bush. In this manner, the releasing part and the locking part are located outside of the bush. Further, a stop part may be coupled to a side of the vibration-damping ring remote from the first component. The stop part can be coupled to the vibration-damping ring via clips. An end of the leaf-spring arrangement can be embedded in the vibration-damping ring.

Further, a clamping holder may be arranged to hook over an interior surface of the vibration-damping ring opening and over the stop part, and may be arranged to hold an end of the leaf-spring arrangement.

In accordance with yet another feature of the present invention, the leaf-spring arrangement may include a base having an upper edge from which at least two leaf-spring arms are arranged to project, and the at least two leaf-spring arms may be inclined inwardly and tapered toward their free ends. The free ends may be arranged to form a segmented ring, which is arranged to provide a positive-locking fit in the engaging recess. The releasing part can be adapted to separate the free ends, thereby disengaging with the engaging recess. Further, the base part can include catches which point outwardly.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
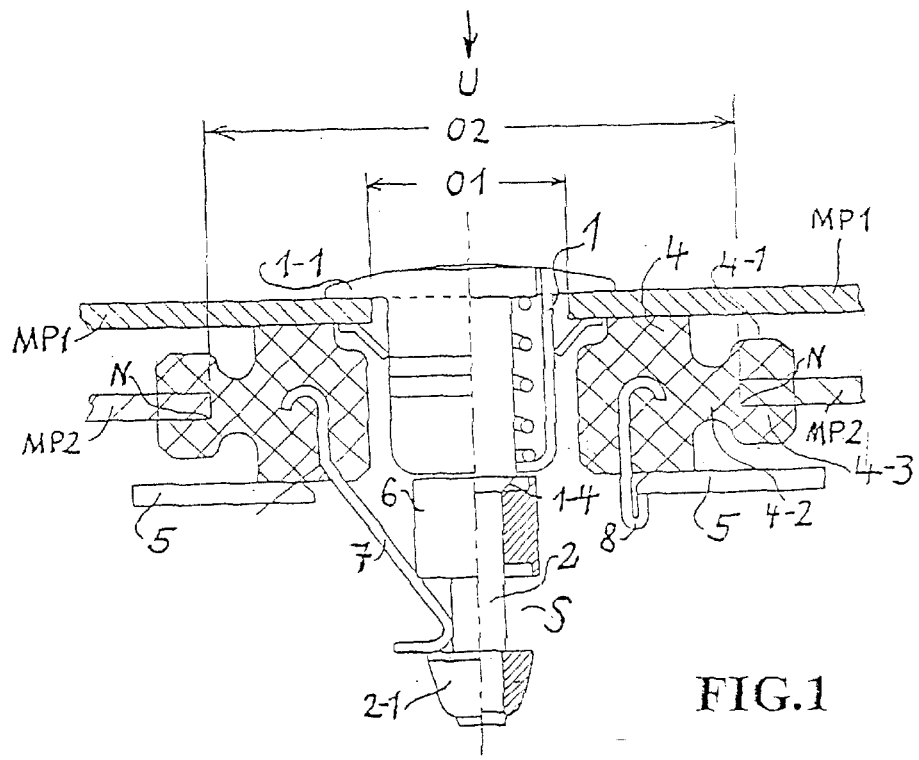
FIG. 1 illustrates a sectional view of a first design version of the connecting arrangement in accordance with the invention with a bush-guided bolt, a ring-shaped space which can be formed between the locking and releasing part and into which the ends of leaf springs can engage, and with a vibration-damping ring in which clips for a securing disk and leaf springs are embedded.

FIG. 1 shows a sectional view of a first design version of the connecting arrangement in accordance with the invention with a bush 1 guided bolt 2, a ring-shaped space S which can be formed between a locking part 2-1 and releasing part 6 to detachably engage a free end of a leaf spring 7. It is noted that, while only one leaf-spring arm is shown in FIG. 1, for reasons of simplification of explanation, at least 2 and preferably 3 leaf-spring arms can be utilized for the connecting arrangement of the instant invention. A vibration-damping ring 4 is provided, in which clips 8 for a securing disk 5 and leaf springs 7 are embedded.

Bush 1 is secured like a sleeve in the hole O1 of a first component MP1. Grooves R in bush 1 are arranged to engage the securing ring so as to adapt to different thicknesses of component MP1 and serve to balance out tolerances). Bolt 2 guided in bush 1 projects out of a lower opening of bush 1. On the projecting part of bolt 2, a movable ring-shaped releasing element (or expanding element) 6 is located. Bolt 1 has a locking piece 2-1 at its end, and the diameter of locking piece 2-1 is greater than that of the bolt in a moving area of releasing element 6, which is located movably between locking part 2-1 and a shoulder 1-4 on bolt 1.

In the position shown in FIG. 1, there is a ring-shaped engagement area S between releasing part 6 and locking part 2-1 for the ends of leaf springs 7.

To release the connection, bolt 1 is pushed in direction U against the force of the ends of leaf-springs 7. Releasing part (expanding ring) 6, which also moves, expands the ends of leaf-springs 7 out of the diminishing engagement area S. Component MP1 and bush 1 connected with it can then be pulled out of the area of the expanded ends of leaf-spring 7. Leaf spring 7 is connected with a second component MP2 via vibration-damping ring 4.

To connect both components MP1 and MP2, bolt 1 and locking part 2-1, e.g., a conical locking part, are pressed in direction U, which forces the ends of leaf-springs 7 to expand outwardly until they hook into engagement area S, and, thereby, push releasing part 6 in direction U.

Vibration-damping ring 4 has a peripheral bead 4-1 with a neck (4-2) and a head part 4-3. In head part 4-3, there is a groove to receive an edge of hole O2 in second component MP2.

Securing ring 5, which prevents vibration-damping ring 4 from being pulled through hole O1 under extreme loading in the opposite direction from U, has an outer diameter which is greater than a diameter of hole O2, and is connected with vibration-damping ring 4 by clips 8, which, like leaf-springs 7, are embedded in vibration-damping ring 4.

Vibration-damping ring 4 can be made of vibration-damping material, e.g., rubber, plastic, in particular, silicone, or similar material.

Figure 2:
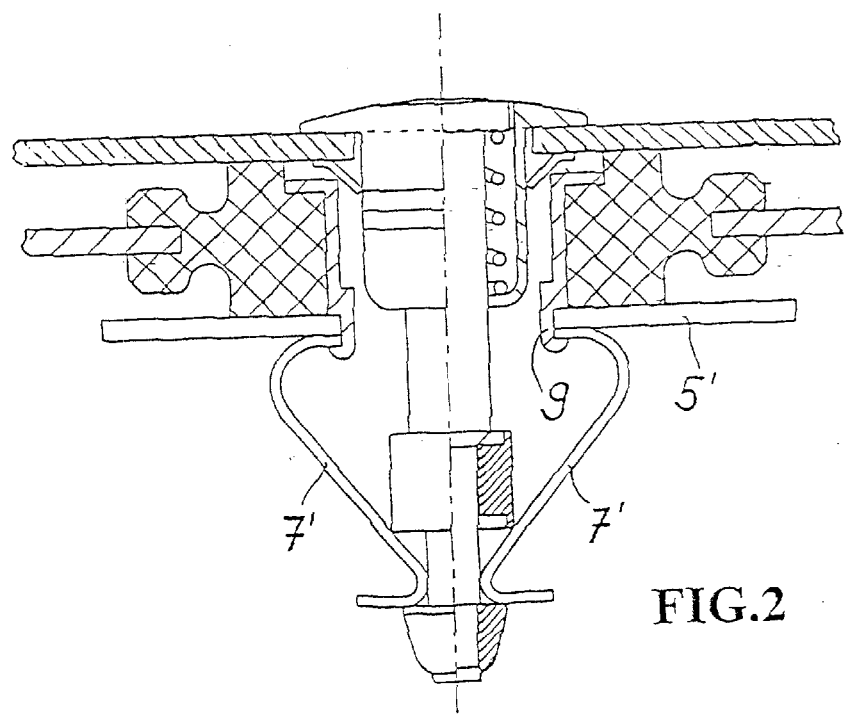
FIG. 2 illustrates a sectional view of a second design version of the connecting arrangement in accordance with the invention with a bush-guided bolt, a ring-shaped space which can be formed between the locking and releasing part and into which the ends of leaf springs can engage, and with a vibration-damping ring to whose interior wall a clamping holder for a securing ring and the leaf-spring arrangement are attached.

FIG. 2 shows a sectional view of a second design version of the connecting arrangement in accordance with the invention. This embodiment includes a bush-guided bolt, a ring-shaped space which can be formed between the locking and releasing part and into which the ends of leaf springs can engage, and with a vibration-damping ring to whose interior wall a clamping holder 9 for a securing ring 5' and the leaf-spring arrangement 7' are attached.

Apart from the attachment of securing ring 5' and leaf-spring arrangement 7', the embodiment depicted in FIG. 2 substantially corresponds to that shown in FIG. 1.

In the alternative embodiment of FIG. 2, leaf springs 7' and securing ring 5' are held by a clamping holder 9 which hooks over an interior wall of vibration-damping ring 4.

Due to clamping holder 9, a height of this connecting arrangement is greater than in FIG. 1.

Figure 3:
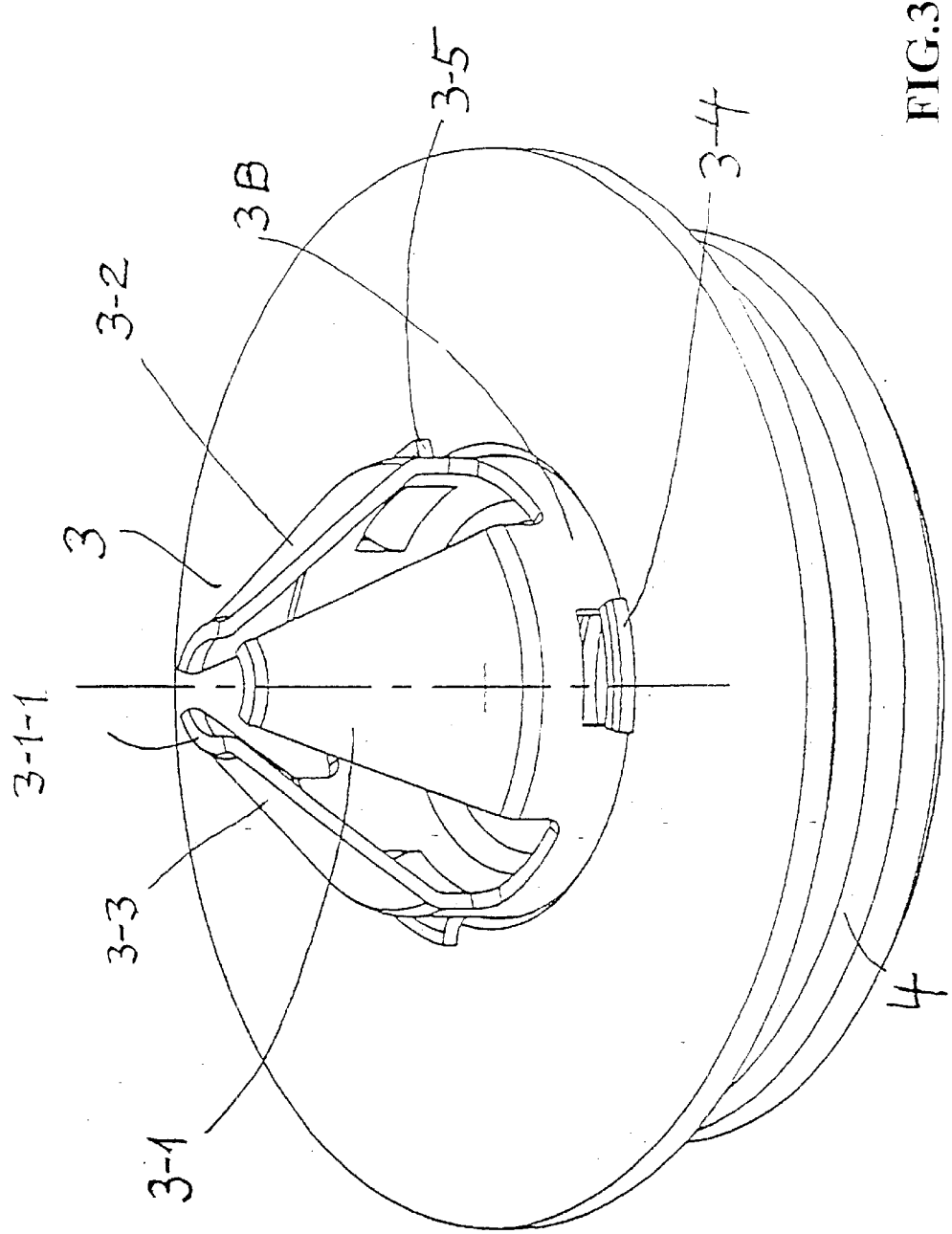
FIG. 3 illustrates a perspective view of a leaf-spring arrangement in the form of a hollow truncated cone, which has three leaf-spring arms arranged on one base ring.

With reference to FIG. 3, it should be noted that another method of attachment is possible.

In this regard, the arrangement of leaf springs may be different than in the previous embodiments, e.g., separate or connected leaf-springs can be utilized whose free ends are designed for positive locking engagement in the engagement space. Moreover, the leaf-spring arms may be in the form of strips, which taper toward their free end or a similar form.

Further, the free end of the leaf-spring may be fixed in different ways.

The ring-shaped engagement space S may require an arrangement of leaf springs with at least two but preferably three leaf-spring arms, which are evenly spaced over the circumference.

FIG. 3 shows a perspective view of a leaf-spring arrangement 3 in the form of a hollow truncated cone, which has three leaf-spring arms 3-1, 3-2 and 3-3 arranged on one base ring.

Leaf-spring arms 3-1, 3-2, and 3-3 are tapered toward their free ends, and have a common base 3-B, which is bent together to form a ring. The free ends of the leaf-spring arms are inclined inwardly toward each other so as to form segments of an assumed hollow truncated cone. As viewed from above, upper edges 3-1-1 of the free ends form a ring segment, which is the correct shape for positive locking engagement in ring-shaped engagement space S.

In a sectional view from a plane intersecting the assumed axis of the leaf-spring arrangement 3 shown, the free end of the leaf spring is curved slightly outwards to ensure that it can be expanded smoothly by the releasing or locking part (with a conical tip).

Base part 3-B includes catches 3-4, 3-5, etc., which point outwardly and serve as retaining stops for the securing disk under them. The lower edge of base part 3-B can be permanently connected with vibration-damping ring 4, e.g. by adhesive bonding, clamping, embedding, etc.

It is noted that the foregoing examples have been provided merely for the purpose of explanation and are in no way to be construed as limiting of the present invention. While the present invention has been described with reference to an exemplary embodiment, it is understood that the words, which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connecting arrangement for the detachable connection of two components having openings aligned toward one another, comprising:
    a bolt having a shoulder part;
    a bush with a bush head adapted to extend into the opening of a first of the two components such that said bush head is adapted to be coupled to the first component;
    a locking part being attached to an end of said bolt;
    a leaf-spring arrangement adapted for connection to a second of the two components to engage said locking part when said bolt is pressed into said bush to a locking position;
    a releasing part, which is movably coupled to said bolt between said shoulder part and said locking part, wherein said releasing part is arranged to expand said leaf-spring arrangement, thereby releasing the engagement between said locking part and said leaf-spring arrangement when said bolt is pressed further into said bush to a release position;
    a vibration-damping ring comprising of elastic material having an opening to receive said bush and a peripheral groove arranged concentrically to a ring axis, which is adapted to receive an edge of the opening of the second component, wherein said vibration-damping ring is adapted for coupling to the first component;

said leaf-spring arrangement being coupled to said vibration-damping ring; and a stop located on a side of said vibration-damping ring which is adapted to be turned away from the two components.

2. The arrangement in accordance with claim 1, wherein said stop comprises a disk ring whose outer diameter is greater than a diameter of the opening in the second component.

3. The arrangement in accordance with claim 1, further comprising clips, wherein each clip has an end embedded in said vibration-damping ring, wherein said stop is coupled to said vibration-damping, ring by said clips.

4. The arrangement in accordance with claim 3, wherein said ends of said clips are embedded in the vibration-damping ring by one of vulcanization or casting in.

5. The arrangement in accordance with claim 1, wherein a part of said leaf-spring arrangement is embedded in said vibration-damping ring by one of vulcanization or casting in.

6. The arrangement in accordance with claim 1, further comprising a clamping holder arranged to hook over an interior wall of said vibration-damping ring, wherein at least one of said stop and said leaf-spring arrangement are coupled to said clamping holder.

7. The arrangement in accordance with claim 1, wherein said leaf-spring arrangement comprises a base, bent in the form of a ring, having an upper edge from which at least two leaf-spring arms are arranged to project, said at least two leaf-spring arms being inclined inwardly and tapered toward their free ends, and wherein said free ends are arranged to form a ring segment for a positive-locking fit in an engaging recess located between said locking part and said releasing part, and are further arranged to be expanded by said releasing part.

8. The arrangement in accordance with claim 7, wherein said free ends of said leaf-spring arms are bent outwardly.

9. The arrangement in accordance with claim 7, wherein said base part comprises catches which point outwardly.

10. The arrangement in accordance with claim 1, wherein, when said leaf-spring arms engage an engaging recess between said locking part and said releasing part, said releasing part lies against said leaf-spring arms.

11. An apparatus for the detachable connection of a first and second component, in which, in connection, the first and second components each have openings aligned with each other, said apparatus comprising:

a vibration-damping ring having an opening adapted to align with the openings of said first and second components and a peripheral groove arranged concentrically to said vibration-dampening ring opening;

a bolt having a shoulder part which is axially insertable within said vibration-damping ring opening;

a locking part attached to an end of said bolt;

a releasing part, which is axially movably along said bolt between said shoulder part and said locking part;

a leaf-spring arrangement coupled to said vibration-damping ring and detachably coupled to an engaging recess delimited by said locking part and said releasing part.

12. The apparatus in accordance with claim 11, wherein said peripheral groove of said vibration-damping ring is adapted to receive an edge of the opening of the second component.

13. The apparatus in accordance with claim 12, wherein said vibration-damping ring is adapted to contact said first component, wherein a bush is adapted for insertion into the opening in the first component, and is insertable into said vibration-damping ring, and wherein said bolt is insertable into through said bush, whereby said releasing part and said locking part are located outside of said bush.

14. The apparatus in accordance with claim 13, further comprising a stop part being coupled to a side of said vibration-damping ring remote from the first component.

15. The apparatus in accordance with claim 14, wherein said stop part is coupled to said vibration-damping ring via clips.

16. The apparatus in accordance with claim 14, wherein an end of said leaf-spring arrangement is embedded in said vibration-damping ring.

17. The apparatus in accordance with claim 14, further comprising a clamping holder arranged to hook over an interior surface of said vibration-damping ring opening and over said stop part, and arranged to hold an end of said leaf-spring arrangement.

18. The apparatus in accordance with claim 11, wherein said leaf-spring arrangement comprises a base having an upper edge from which at least two leaf-spring arms are arranged to project, said at least two leaf-spring arms being inclined inwardly and tapered toward their free ends, and wherein said free ends are arranged to form a segmented ring which is arranged to provide a positive-locking fit in said engaging recess.

19. The apparatus in accordance with claim 18, wherein said releasing part is adapted to separate said free ends, thereby disengaging with said engaging recess.

20. The arrangement in accordance with claim 18, wherein said base part comprises catches which point outwardly.

* * * * *